Sept. 9, 1941.　　　　R. N. JANEWAY　　　　2,255,619
RAILWAY VEHICLE
Filed Dec. 13, 1937　　　2 Sheets-Sheet 1
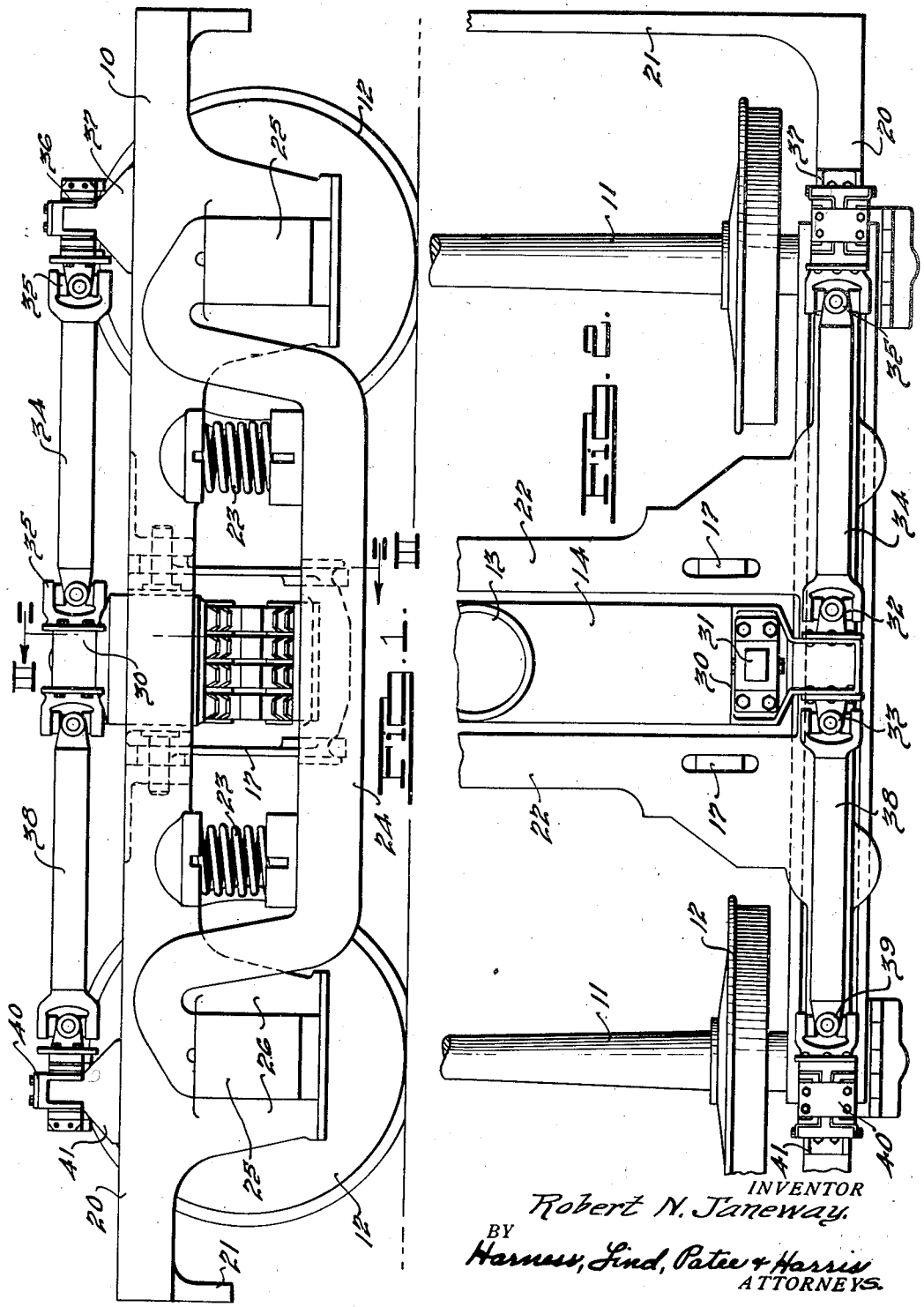
INVENTOR
Robert N. Janeway.
BY
Harness, Lind, Patee & Harris
ATTORNEYS.

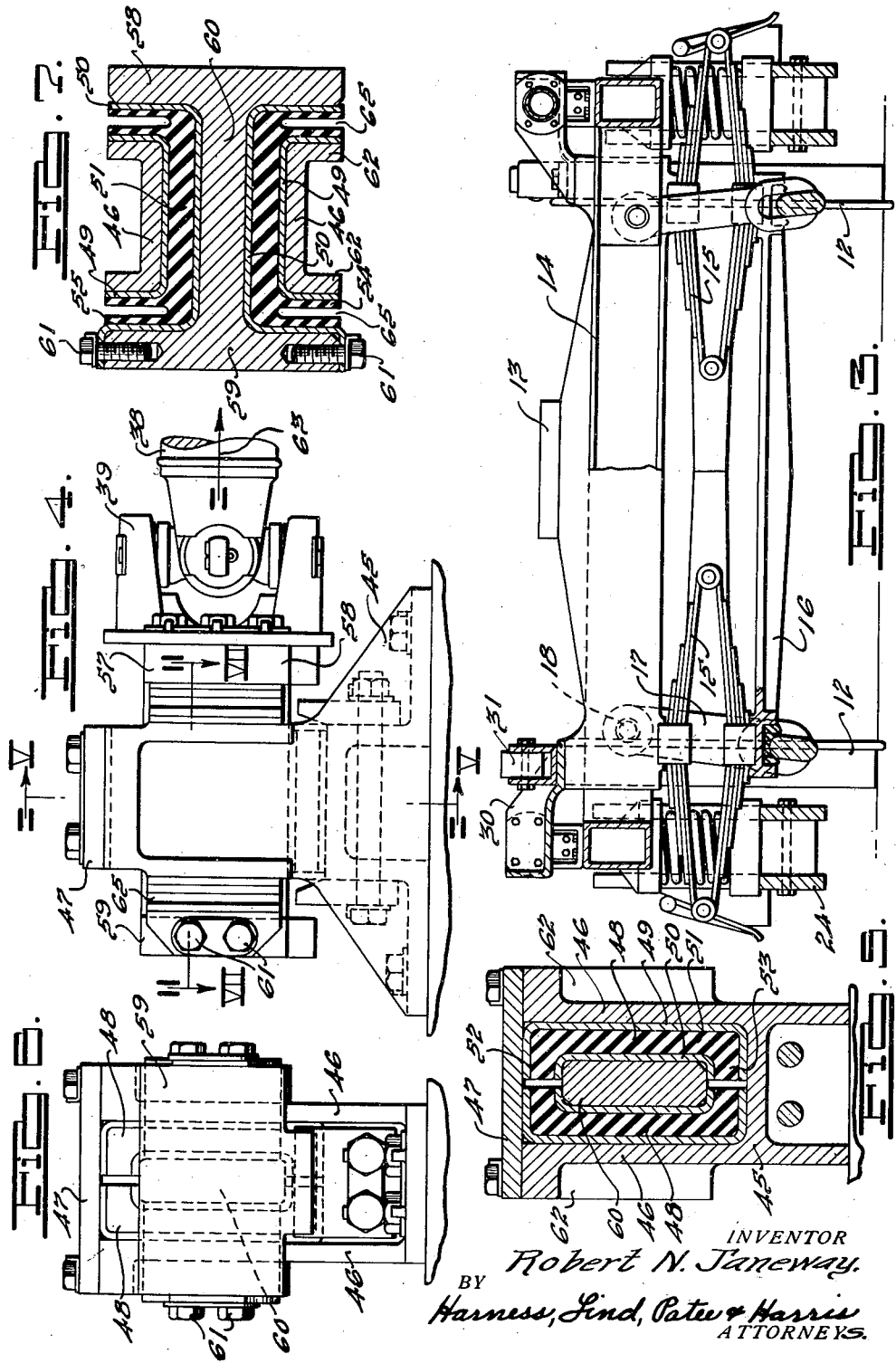

Patented Sept. 9, 1941

2,255,619

UNITED STATES PATENT OFFICE 2,255,619

RAILWAY VEHICLE

Robert N. Janeway, Detroit, Mich., assignor to Chrysler Corporation, Highland Park, Mich., a corporation of Delaware Application December 13, 1937, Serial No. 179,409

9 Claims. (Cl. 105—190)

My invention relates to railway equipment and pertains particularly to an improvement in trucks for use on such equipment.

One object of my invention is to provide a novel type of mechanism to prevent the bolster of a truck from frictionally engaging any portion of the truck frame during normal operation and at the same time permit relative vertical and lateral movement therebetween.

Another object of my invention consists in providing a novel means whereby a truck bolster is permitted to move freely with respect to the associated truck frame in both vertical and lateral directions, and is permitted to move longitudinally of the truck frame to only a limited degree from a central position thereon, and whereby such longitudinal movement is resiliently opposed.

For a better understanding of my invention reference may now be had to the accompanying drawings, of which:

Fig. 1 is a side elevational view of a railway car truck embodying my invention.

Fig. 2 is a plan view of the structure illustrated in Fig. 1.

Fig. 3 is a vertical cross-sectional view of the structure illustrated in Fig. 1, the view being taken along the lines III—III thereof.

Fig. 4 is a side elevational view of a bolster link supporting device constituting a portion of my invention.

Fig. 5 is a vertical cross-sectional view of the structure illustrated in Fig. 4, this section being taken along the line V—V thereof.

Fig. 6 is an end elevational view of the supporting device illustrated in Fig. 4.

Fig. 7 is a horizontal cross-sectional view of a portion of the supporting device illustrated in Fig. 4, the section being taken along the line VII—VII thereof.

In the drawings I have illustrated a railway car truck of the type normally used on passenger cars comprising a truck frame 10 mounted on wheel axles 11 on which are mounted the usual rail engaging wheels 12. The weight of the car body is carried by the usual center bearing 13, mounted on a normally laterally extending truck bolster member 14, the ends of which are supported upon two spaced elliptical leaf springs 15, which in turn rest upon the ends of a transversely extending spring plank 16. This spring plank 16 is supported at its ends on swing links 17 which are pivotally mounted on the truck frame 10 as illustrated at 18. The truck frame 10 comprises longitudinally extending side members 20, transversely extending end members 21 and transversely extending intermediate members 22, generally called transoms. The swing links 17 are pivotally secured to the transoms 22.

The truck frame 10 rests, at each side, on two spaced coil springs 23 which, in turn, rest upon an equalizer bar 24, the ends of which rest on the tops of wheel axle journal boxes 25. The journal boxes 25 are confined between guide members 26, constituting a portion of the side frames 20, and serving to limit the movement of the journal boxes therebetween to movement in a vertical direction only.

My invention is particularly directed to means for preventing longitudinal displacement of the bolster members 14 so as to prevent engagement between the bolster members 14 and the transom members 22. When these members are in engagement the frictional resistance to movement causes any forces transmitted to the truck frame to be transmitted directly to the bolster member and thus to the car body, to the discomfort of the passengers. This is true because the leaf spring members 15 are short-circuited by the engagement of the bolster members 14 and the transom members 22. At the same time it is desirable that the bolster member 14 be permitted to move freely both in vertical and lateral directions in order that the springs 15 and the swing links 17 may perform their functions of diminishing or eliminating undesirable shocks being transmitted to the car body from the truck frame.

In order to prevent undue movement of the bolster longitudinally of the truck frame I have provided a mounting member 30 which is rigidly secured to each end of the bolster member 14. In addition, the usual roller member 31, which is adapted to engage the car body bolster, is likewise mounted on the end of the truck bolster. Secured to each of the mounting members 30 are two universal joints 32 and 33, the former being secured to the rearward side thereof. The expressions "forward" and "rearward" side are employed for purposes of clarity although both ends of the truck are identical in construction. Secured to the universal joints 32 are a pair of link members 34 which extend forwardly to universal joints 35 which, in turn, are connected to a flexible member 36 supported by a mounting 37 secured to the truck frame 10 adjacent the forward end thereof. The links 34 extend longitudinally of the truck frame as long as the bolster member 14 is centrally disposed with respect to the truck frame but the universal joints permit freedom of transverse and vertical motion thereof with respect to the truck frame.

In like manner, a pair of links 38 are secured to the universal joints 33 and are in turn secured by means of universal joints 39 to a flexible member 40 supported upon a mounting 41 secured to the truck frame adjacent the rear ends thereof. The links 38, similarly to the links 34, normally extend longitudinally of the truck frame 10. By this construction the bolster member 14 is held in spaced relationship longitudinally of the truck frame with respect to the transoms 22 by means of four pivoted links, two secured to each end thereof, one pair extending forwardly and the other pair extending rearwardly.

As best illustrated in Figs. 4 to 7, inclusive, the mounting members 37 and 41, which are identical, comprise a supporting base 45 having two upwardly extending side members 46 which are secured together at their tops by means of a transversely extending plate 47 bolted thereto. Disposed between the upwardly extending legs 46 are two similar flexible units 48, each comprising an outer metallic plate 49 and an inner metallic plate 50, both preferably vulcanized to an intermediately disposed rubber member 51. The rubber members 51 and their associated plates 48 and 49 are each provided with upper and lower horizontally inwardly extending flange portions 52 and 53, respectively, and with vertical outwardly extending flange portions 54 and 55. The universal joints 35 and 39 are each secured to a metallic base member 57 having two transversely extending flanges 58 and 59 interconnected by means of an integral longitudinally extending centrally disposed web 60.

As a result of this construction, any force longitudinally of the truck, as indicated by the arrow 63 in Fig. 4, tends to move the support 57, with its plates 58 and 59 and web member 60 in a right hand direction with respect to the stationary support 45, which movement is permitted but resiliently opposed by the rubber body 51. It will be noted that the laterally extending flanges of the rubber member 51 are slotted, as shown at 65. These slots serve the purpose of permitting movement of the member 57, with respect to the stationary base 45, a distance equal to the width of the slot, opposed only by the shear stresses in the rubber connecting the legs 46 to the central web 60, which force is sufficient to prevent undue longitudinal displacement of the bolster under the normally applied thrusts such as occurs with normal application of the brakes. Any abnormal forces such as emergency braking, however, will cause closing of the slots 65 at one end of the rubber member, depending on the direction of the forces, and bring the rubber on both sides of the slot under compression. As the compressional resistance of rubber greatly exceeds the shear forces this construction provides an initial small force which opposes longitudinal movement of the bolster with respect to the frame under normal operating conditions and a considerably greater force opposes excessive movement thereof under abnormal conditions.

In addition, the member 57 may move either vertically, laterally or angularly with respect to the stationary support 45 with but little opposition thereto from the links 34 and 38. It will be noted that the links 34 and 38 are secured to the universal joints 32 and 33 mounted on the end of the bolster 14 and the opposite ends of the links are secured to the universal joints 35 and 39. Either lateral or vertical movement of the bolster 14 with respect to the transoms 22 will move the links 34 and 38 out of alignment with each other, thus increasing the distance between the universal joints 32 and 33 and their mounting members 37 and 41, which movement, although relatively slight, owing to the length of the links 34 and 38, prohibits the use of rigid mounting of the universal joints 35 and 39. Such movement is restored by gravitational forces, and the flexible units 36 contribute but little to the restoring forces when the displacement is vertical or lateral.

The flexible members also serve to insulate the links from the truck frames, which is desirable, owing to the fact that the links are secured to the truck bolster which is in metal to metal contact with the car body which it supports whereas the mounting members 37 and 41, to which the links are connected through the flexible member, are in metal to metal contact with the truck frame 10.

It will be apparent from the foregoing description that the links 34 and 38 will oppose vertical and lateral movement of the bolster 14 with respect to the transom members 22 with a degree of force which is relatively small for a small movement of the bolster but which increases with any continuation of that movement. Also, it will be obvious that a small amount of longitudinal movement of the bolster member 14 with respect to the transom members 22 is likewise permitted, but that the amount of longitudinal movement permitted is relatively small as compared to the vertical or lateral movement permitted, and that the forces opposing longitudinal movement will build up at a very much greater rate than will be forces opposing lateral or vertical movement, which are of moderate proportions within a moderate range of movement of the bolster member. The rubber members 48 are preferably of such thickness as to prevent sufficient movement longitudinally of the truck on the part of the bolster 14 to enable it to engage in metal to metal contact with the transom members 22.

Although I have illustrated but one form of my invention and have described in detail but a single application thereof, it will be apparent to those skilled in the art that it is not so limited but that various modifications and changes may be effected therein without departing from the spirit of my invention, or from the scope of the appended claims.

I claim:

1. In a railway vehicle truck, a truck frame, a relatively movable truck bolster member disposed intermediate laterally extending portions of said truck frame, and means for maintaining said bolster member in spaced relationship with said truck frame portions comprising a mounting on said bolster member, a mounting on said truck frame remote from said bolster member, a resilient means mounted on one of said mountings, and a link extending longitudinally of said truck frame and pivotally connected to said resilient means and to the other mounting, said link and said resilient means being adapted to transmit both tensional and compressional forces.

2. In a railway vehicle truck, a truck frame, a relatively movable truck bolster member disposed intermediate laterally extending portions of said truck frame, and means for maintaining said bolster member in spaced relationship with said truck frame portions comprising a mounting on said bolster member, a mounting on said frame remote from said bolster member, a rubber member secured to said last named mounting, a metal fastening member secured to said rubber member and maintained thereby out of engagement with the associated mounting, and a link member extending longitudinally of said truck frame and pivotally connected to said metal fastening member and to said bolster mounting and adapted to transmit tensional and compressional forces therebetween.

3. In a railway vehicle truck, a truck frame, a relatively movable truck bolster member disposed intermediate laterally extending portions of said truck frame, and means for maintaining said bolster member in spaced relationship with said truck frame portions comprising a mounting on said bolster member, a mounting on said frame, a rubber member secured to said last named mounting, a metal fastening member secured to said rubber member and maintained thereby out of engagement with the associated mounting, and a link member normally extending longitudinally of said truck frame and connected to said metal fastening member at a point remote from said bolster member and to said bolster mounting by means of universal joints said link members and said universal joints being adapted to transmit forces in both directions longitudinally of said vehicle between said bolster member and said truck frame.

4. In a railway vehicle truck, a truck frame, a relatively movable truck bolster member disposed intermediate laterally extending portions of said truck frame, and means for maintaining said bolster member in spaced relationship with said truck frame portions comprising two pairs of spaced parallel link members each secured by means of universal joints to said bolster member adjacent one end thereof and extending normally longitudinally of said frame, one pair of said spaced links being secured to said frame at points remote from said bolster member and forwardly thereof by means of resiliently mounted universal joints and the other pair of spaced links being secured to said frame at points remote from said bolster member and rearwardly thereof by means of resiliently mounted universal joints, said links, resilient mountings and universal joints each being adapted to transmit both tensional and compressional forces.

5. In a railway vehicle truck, a truck frame, a relatively movable truck bolster member disposed intermediate laterally extending portions of said truck frame, and means for maintaining said bolster member in spaced relationship with said truck frame portions comprising two pairs of oppositely extending spaced parallel links disposed longitudinally of said truck frame, each link being secured to said bolster member adjacent one end thereof by means of a universal joint, mounting members on said truck frame disposed remote from said bolster member, non-metallic flexible members secured to said mounting members, and universal joints adapted to secure the free ends of said links to said non-metallic flexible members, said links and universal joints being adapted to transmit both tensional and compressional forces.

6. In a railway vehicle truck, a truck frame, a relatively movable truck bolster member disposed intermediate laterally extending portions of said truck frame, and means for maintaining said bolster member in spaced relationship with said truck frame portions comprising two spaced parallel links connected to opposite ends of said bolster member by means of universal joints and connected to one end of the truck frame at points remote from said bolster member through flexible supporting members and universal joints, and two spaced parallel links connected to opposite ends of said bolster member by means of universal joints and connected to the opposite end of said truck frame at points remote from said bolster member through flexible supporting members and universal joints, all of said links being adapted to extend longitudinally of said truck frame when said bolster member is disposed in its normal position and to transmit both tensional and compressional forces.

7. In a railway vehicle truck, a truck frame, a relatively movable truck bolster member disposed intermediate laterally extending portions of said truck frame, and means for maintaining said bolster member in spaced relationship with said truck frame portions comprising oppositely extending link members disposed longitudinally of said truck frame and secured to said bolster member by means of universal joints and secured to opposite ends of said truck frame by means of universal joints, and non-metallic means interposed in the connection from said bolster through said links to said frame member, said links and universal joints being adapted to transmit both tensional and compressional forces.

8. In a railway vehicle truck, a truck frame, a truck bolster member movable relatively to said truck frame and disposed intermediate laterally extending portions of said truck frame, and means for maintaining said bolster member in spaced relationship with said truck frame portions comprising a mounting on said bolster member, a mounting on said truck frame remote from said bolster member, resilient means carried by at least one of said mountings, and linkage extending longitudinally of said truck frame to connect said mountings through said resilient means, said linkage and said resilient means being adapted to transmit both tension and compression forces and being so constructed and arranged as to accommodate relative movement in all directions between said truck frame and said bolster member.

9. In a railway vehicle truck, a truck frame, a truck bolster member movable relatively to said truck frame and disposed intermediate laterally extending portions of said truck frame, and means for maintaining said bolster member in spaced relationship with said truck frame portions comprising a mounting on said bolster member, a mounting on said truck frame remote from said bolster member, non-metallic resiliently deformable means carried by at least one of said mountings, and linkage extending longitudinally of said truck frame to connect said mountings through said resilient means, said linkage and said deformable means being adapted to transmit both tension and compression forces between said truck frame and said bolster member with accompanying deformation of said deformable means and being so constructed and arranged as to accommodate relative movement in all directions between said truck frame and said bolster member.

ROBERT N. JANEWAY.